No. 669,527. Patented Mar. 12, 1901.
J. V. HULSE.
ALINING AND LEVELING DEVICE.
(Application filed July 11, 1899.)
(No Model.)
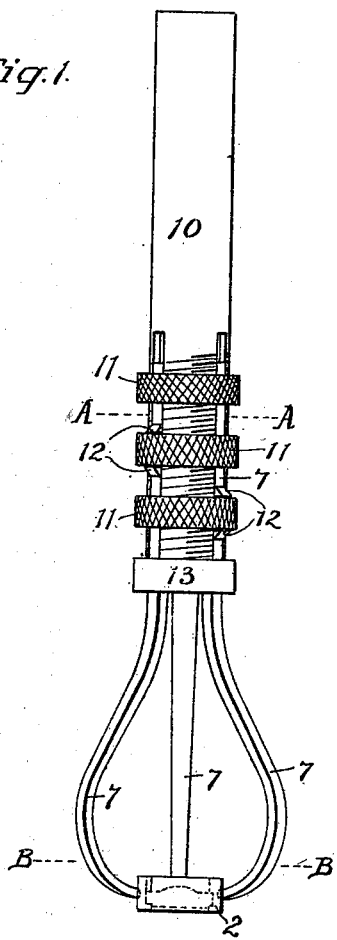
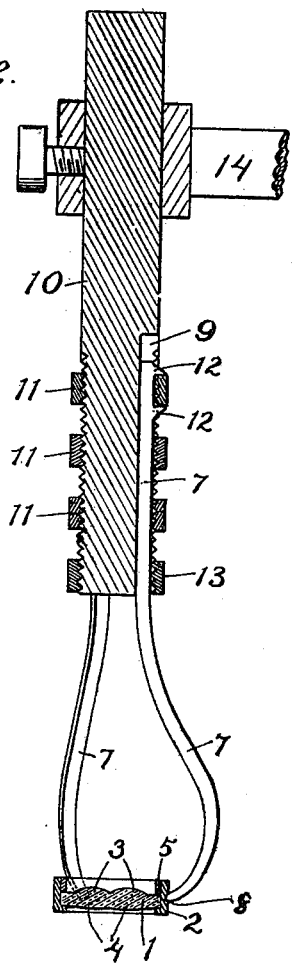
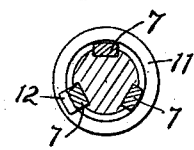
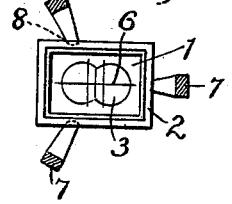
WITNESSES:
J. Green
Peter F. Sonnek.
INVENTOR
James V. Hulse
BY
ATTORNEYS
THE NORRIS PETERS CO., PHOTO-LITHO., WASHINGTON, D. C.

UNITED STATES PATENT OFFICE.

JAMES V. HULSE, OF BROOKLYN, NEW YORK.

ALINING AND LEVELING DEVICE.

SPECIFICATION forming part of Letters Patent No. 669,527, dated March 12, 1901.

Application filed July 11, 1899. Serial No. 723,442. (No model.)

*To all whom it may concern:*

Be it known that I, JAMES V. HULSE, a citizen of the United States, residing at Brooklyn, in the county of Kings and State of New York, have invented certain new and useful Improvements in Alining and Leveling Devices, of which the following is a specification.

This invention relates to improvements in alining and leveling devices, and particularly to a device of this nature wherein the leveling is effected by the use of a gage provided with an obscuring medium, as set forth in my prior application, Serial No. 703,218, filed January 24, 1899.

My present application relates in part to features disclosed but not specifically claimed in such prior application and in part to further development or amplification of such features. Said prior application disclosed the use of a transparent gage with an obscuring medium on the side toward the object to be gaged.

The present application relates to a gage so constituted that the obscuring medium forms part of the solid gage-body either by the grinding or etching of the gage-face or by forming the gage-body as a whole or in part of an obscuring medium or in any other suitable manner. The said prior application disclosed the use of a ground-glass gage and also of other solid obscuring materials; but such form of the invention was not specifically claimed therein.

A further feature of the present invention is the provision of means for angular or tilting adjustment of the gage in a convenient and effective manner, such means being particularly adapted to cases where it is desirable to remove the adjusting devices from immediate proximity of the gage to avoid interference with parts of the machine.

The accompanying drawings represent a gage and supporting device therefor constructed according to my invention.

Figure 1 is an elevation; Fig. 2, a vertical section; and Figs. 3 and 4, horizontal sections, respectively, on the lines A A and B B of Fig. 1.

1 represents the gage-plate, supported on a frame 2 and having, if desired, magnifying or lenticular facets 3 and gage-facets 4, the latter of which are adapted to conform to the face of the body to be alined—for example, the faces of the two type on a double-type bar of a typewriting-machine, as specified in my prior application above referred to. The gage-plate may be held in frame 2, bezel 5, and the frame 2 is adapted to be supported and manipulated in any desired manner—for example, as hereinafter set forth.

My invention involves the provision of obscuring means for the gage, whereby the visibility of a body as seen through the gage from above depends on the closeness of said body to the lower face of the gage. I find that this effect can be produced by a solid obscuring means to an extent sufficient for some purposes. Thus I may make the gage-plate 1 of transparent glass and etch or grind the facets 4 of same, or I may make the gage of opal glass or generally of any material which is translucent but not completely or substantially transparent—for example, tourmaline of certain varieties—or I may use for this gage-plate a solid body of double refracting properties, such as Iceland spar or tourmaline. In any case the body must be diaphanous—that is, it must allow of the passage of light—but it must also be obscuring, so as to prevent direct and full visibility through same. It may of course consist of either a single body or of several solid bodies cemented or otherwise attached together.

The device is used by bringing the object in contacting relation with its gage-face 4, and the trueness or extent of contact is shown by the clearness with which the face of object appears through the gage. The gage-body 1 may be provided on either face with lines 6 to aid in alining the object operated upon, which may, for example, be a type, as above specified.

The gage is preferably supported and adjusted by means of a plurality of bars or suspending devices 7 7 7, engaging with three parts of frame 2, as by entering sockets or depressions 8 in said frame 2, and adapted to be adjusted at their other ends by any suitable means, as by engaging in vertical grooves 9 in a supporting-spindle 10, which is screw-threaded, as shown, and carries knurled screw-rings 11, engaging, respectively, by lugs 12 with the several bars 7, so that by rotating the different rings any one or more of the bars 7 may be raised or depressed to tip the gage in any desired manner.

13 represents a screw-collar giving a firmer support to the bars 7. The spindle 10 may be clamped to a supporting-arm 14, whereby it is supported and held or adjusted to the desired position, as described in my application above referred to. There may be, of course, more than three of the supporting devices 7, each adjustable independent of the others.

Having thus described my invention, the following is what I claim as new therein and desire to secure by Letters Patent:

1. An alining and leveling device, comprising a solid diaphanous obscuring-gage and means for adjusting said gage in contacting relation with the object to be gaged.

2. An alining and leveling device, comprising a solid translucent obscuring-gage and means for adjusting said gage in contacting relation with the object to be gaged.

3. An alining and leveling device, comprising a gage formed of a solid diaphanous obscuring-body and means for adjusting said gage in contacting relation with the object to be gaged.

4. An alining and leveling device, comprising a gage formed of a solid translucent obscuring-body and means for adjusting said gage in contacting relation with the object to be gaged.

5. The combination with a gage, of a plurality of supporting devices engaging with the gage at a plurality of points, and means for independently adjusting the position of the several supporting devices such means comprising a spindle, bars independently adjustable in said spindle, and screw-rings surrounding said spindle and engaging with said spindle and said bars to adjust the bars independently.

JAMES V. HULSE.

Witnesses:
ARTHUR P. KNIGHT,
JOSEPH J. SCHMIDT.